(12) United States Patent
Germanaud et al.

(10) Patent No.: US 11,370,977 B2
(45) Date of Patent: Jun. 28, 2022

(54) METHOD OF PROVIDING DRILLING FLUID AND SOLVENT

(71) Applicant: TOTAL MARKETING SERVICES, Puteaux (FR)

(72) Inventors: Laurent Germanaud, Heyrieux (FR); Clarisse Doucet, Levallois Perret (FR)

(73) Assignee: TOTAL MARKETING SERVICES, Puteaux (FR)

( * ) Notice: Subject to any disclaimer, the term of this patent is extended or adjusted under 35 U.S.C. 154(b) by 0 days.

(21) Appl. No.: 16/906,510

(22) Filed: Jun. 19, 2020

(65) Prior Publication Data

US 2020/0318018 A1 Oct. 8, 2020

Related U.S. Application Data

(62) Division of application No. 15/574,582, filed as application No. PCT/EP2016/061506 on May 20, 2016, now abandoned.

(30) Foreign Application Priority Data

May 20, 2015 (EP) .................................... 15168547

(51) Int. Cl.
| | | |
|---|---|---|
| *C10G 45/58* | (2006.01) | |
| *C10G 3/00* | (2006.01) | |
| *C10G 45/00* | (2006.01) | |

(52) U.S. Cl.
CPC ............... *C10G 45/58* (2013.01); *C10G 3/42* (2013.01); *C10G 3/50* (2013.01); *C10G 45/00* (2013.01); *C10G 2300/1011* (2013.01); *C10G 2300/201* (2013.01); *C10G 2300/202* (2013.01); *C10G 2300/301* (2013.01); *Y02P 30/20* (2015.11)

(58) Field of Classification Search
CPC ......... Y02P 30/20; E21B 37/06; C10G 45/58; C10G 45/00; C10G 3/42; C10G 3/50; C10G 2300/201; C10G 2300/202; C10G 2300/1011; C10G 2300/301
USPC .................................................. 585/240–242
See application file for complete search history.

(56) References Cited

U.S. PATENT DOCUMENTS

| | | | |
|---|---|---|---|
| 6,096,940 A * | 8/2000 | Wittenbrink | ........... C10G 45/58 585/750 |
| 6,458,265 B1 | 10/2002 | Miller et al. | |
| 7,667,086 B2 | 2/2010 | Kowalik et al. | |
| 8,048,290 B2 * | 11/2011 | Knuuttila | ............... C10G 29/22 208/64 |
| 8,608,812 B2 | 12/2013 | Perego et al. | |
| 9,469,583 B2 * | 10/2016 | Aalto | ....................... A61K 8/31 |
| 10,435,634 B2 * | 10/2019 | Germanaud | ........... C10G 45/02 |
| 2004/0173502 A1 | 9/2004 | DeHaan et al. | |
| 2006/0264684 A1 | 11/2006 | Petri et al. | |
| 2009/0014354 A1 | 1/2009 | Knuuttila et al. | |
| 2010/0000908 A1 | 1/2010 | Markkanen et al. | |
| 2011/0087058 A1 * | 4/2011 | Harlin | ...................... B01J 31/20 585/240 |
| 2012/0264656 A1 | 10/2012 | Germanaud et al. | |
| 2012/0283492 A1 | 11/2012 | Dalemat et al. | |
| 2014/0303057 A1 * | 10/2014 | Abhari | ................. C10M 105/04 508/589 |
| 2014/0323777 A1 | 10/2014 | Iguchi et al. | |
| 2015/0353841 A1 | 12/2015 | Rispoli et al. | |

FOREIGN PATENT DOCUMENTS

| | | | | |
|---|---|---|---|---|
| DE | 202010004049 U1 * | 6/2010 | ............... | C10G 3/42 |
| EP | 2368967 | 9/2011 | | |
| WO | WO-2015044287 A1 * | 4/2015 | ............... | C09K 8/64 |

OTHER PUBLICATIONS

Total, "Fluids and Solutions, Isoparaffins, Isane", Internet, (2011), pp. 1-2, Internet, URL: http://www.total.de/shared/ccurl/179/11/ISANE_2011.pdf, (Oct. 21, 2015), XP002747965 [DX] 1-15 * the whole document *.
Material Safety Data Sheet for ISANE IP155, Jul. 6, 2012, 18 pages.
Brochure for the ISANE isoparaffin products (available at http://www4.total.fr/pdf/fluides-speciaux/brand/isane-101027-2.pdf, 2010, 5 pages.

* cited by examiner

*Primary Examiner* — Pamela H Weiss
(74) *Attorney, Agent, or Firm* — Duane Morris LLP; Gregory M. Lefkowitz; Brandon A. Chan

(57) ABSTRACT

The invention provides for a fluid having a boiling point in the range of from 100 to 400° C. and comprising more than 95% isoparaffins and containing less than 100 ppm aromatics, obtainable by the process comprising the step of catalytically hydrogenating a feed comprising more than 95% by weight of a hydrodeoxygenated isomerized hydrocarbon biomass feedstock, at a temperature from 80 to 180° C. and at a pressure from 50 to 160 bars. The invention also provides for a fluid having a boiling point in the range of from 100 to 400° C. and a boiling range below 80° C., said fluid comprising more than 95% isoparaffins and less than 3% of naphthens by weight and having a ratio of isoparaffins to n-paraffins of at least 12:1, a biodegradability at 28 days of at least 60%, as measured according to the OECD 306 standard, a biocarbon content of at least 95% by weight, and containing less than 100 ppm aromatics by weight. The invention finally provides for uses of the fluid.

17 Claims, No Drawings

METHOD OF PROVIDING DRILLING FLUID AND SOLVENT

FIELD OF THE INVENTION

The invention relates to the production of biodegradable hydrocarbon fluids, hereinafter referred to as being improved fluids, having a narrow boiling range and having a very low aromatic content and their uses. The invention relates to a process for producing these improved fluids by hydrogenation of HDO/ISO feedstocks.

BACKGROUND ART

Hydrocarbon fluids find widespread use as solvents such as in adhesives, cleaning fluids, solvents for explosives, for decorative coatings and printing inks, light oils for use in applications such as metal extraction, metalworking or demoulding and industrial lubricants, and drilling fluids. The hydrocarbon fluids can also be used as extender oils in adhesives and sealant systems such as silicone sealants and as viscosity depressants in plasticised polyvinyl chloride formulations and as carrier in polymer formulation used as flocculants for example in water treatment, mining operations or paper manufacturing and also used as thickener for printing pastes, as plasticizers in tyre materials. Hydrocarbon fluids may also be used as solvents in a wide variety of other applications such as chemical reactions.

The chemical nature and composition of hydrocarbon fluids varies considerably according to the use to which the fluid is to be put. Important properties of hydrocarbon fluids are the distillation range generally determined by ASTM D-86 or the ASTM D-1160 vacuum distillation technique used for heavier materials, flash point, density, aniline point as determined by ASTM D-611, aromatic content, sulphur content, viscosity, colour and refractive index.

These fluids tend to have narrow boiling point ranges as indicated by a narrow range between Initial Boiling Point (IBP) and Final Boiling Point (FBP) according to ASTM D-86. The Initial Boiling Point and the Final Boiling Point will be chosen according to the use to which the fluid is to be put. However, the use of the narrow cuts provides the benefit of a narrow flash point and may also prevent the emission of Volatile Organic Compounds which are important for safety reasons. The narrow cut also brings important fluid properties such as a better defined aniline point or solvency power, then viscosity, and defined evaporation conditions for systems where drying is important, and finally better defined surface tension.

Nowadays, biodegradability is a requirement for these specific fluids.

US2009/0014354 discloses biodegradable cuts boiling at 356-413° C., and comprising mostly isoparaffins with an amount of naphthenics of not less than 7%. The cuts originate from biological origin.

EP2368967 discloses a solvent composition containing 5 to 30% of $C_{10}$-$C_{20}$ n-alkanes, and 70 to 95% of $C_{10}$-$C_{20}$ iso-alkanes, by weight, said solvent composition being produced from raw materials of biological origin. The solvent composition has a boiling range of 180 to 340° C.

WO00/20534 discloses a solvent issued from Fischer-Tropsch synthesis and which is typically a biodegradable synthetic middle distillate cut and has an isoparaffins to n-paraffins mass ratio of between about 1:1 to about 12:1. The boiling range is above 80° C. A preferred composition is one which has at least 30% (mass) of the isoparaffins as mono-methyl branched.

WO2006/084285 discloses a hydrocarbon fluid composition of synthetic origin comprising isoparaffins and a minimum initial boiling point to maximum final boiling point at or within the range of 110° C. to 350° C. and which is said to be biodegradable. The octane number is said to be less than 60. The applicant is also marketing a composition ISOPAR®, which typically contains more than 20% naphthenic compounds.

US2014/0323777 discloses a process for manufacturing an aviation fuel oil base having an isoparaffin content of 80% by weight or more but at most 91.6%, and an aromatic content of less than 0.1 vol %.

The document "Fluids and Solutions, Isoparaffins, Isane" from Total, (citation from the Internet, pages 1-2, URL: http://www.total.de/shared/ccuri/179/11/ISANE_2011.pdf) discloses a composition of fluids for use in paints with boiling ranges between 100 and 300° C., 100% isoparaffins and an aromatic content of 10 to 50 ppm by weight. The Isane fluid is of fossil origin.

US2012/0283492 discloses a process for hydrogenating a low-sulphur feed into a fluid having a boiling range of not more than 80° C. and having an isoparaffin content of at most about 52% by weight.

There is still a need for fluids with high biodegradability and being of biological origin.

SUMMARY OF THE INVENTION

The invention provides new hydrocarbon fluids, and especially obtainable by the process of the invention, hereafter "improved fluids". The invention thus provides a fluid having a boiling point in the range of from 100 to 400° C. and comprising more than 95% isoparaffins and containing less than 100 ppm aromatics by weight, obtainable by the process comprising the step of catalytically hydrogenating a feed comprising more than 95% by weight of a hydrodeoxygenated isomerized hydrocarbon biomass feedstock, at a temperature from 80 to 180° C., at a pressure from 50 to 160 bars, a liquid hourly space velocity of 0.2 to 5 $hr^{-1}$ and an hydrogen treat rate up to 200 $Nm^3$/ton of feed.

According to an embodiment, the hydrogenation conditions of the process by which the fluid is obtainable are the following:
Pressure: 80 to 150 bars, and preferably 90 to 120 bars;
Temperature: 120 to 160° C. and preferably 150 to 160° C.;
Liquid hourly space velocity (LHSV): 0.4 to 3, and preferably 0.5 to 0.8;
Hydrogen treat rate be up to 200 $Nm^3$/ton of feed.

According to an embodiment, the feed comprises more than 98%, preferably more than 99% of a hydrodeoxygenated isomerized hydrocarbon biomass feedstock, and more preferably consists of a hydrodeoxygenated isomerized hydrocarbon biomass feedstock.

According to an embodiment, the biomass is a vegetable oil, an ester thereof or a triglyceride thereof.

According to an embodiment, a fractionating step is carried out before the hydrogenating step, or after the hydrogenating step or both; according to an embodiment, the process comprises three hydrogenation stages, preferably in three separate reactors.

The invention also provides new hydrocarbon fluids, hereafter "improved fluids", also referring to the fluids obtained by the process of the invention.

The invention thus provides fluids having a boiling point in the range of from 100 to 400° C. and a boiling range below 80° C., said fluid comprising more than 95% isoparaffins and less than 3% of naphthens by weight and having a ratio of iso-paraffins to n-paraffins of at least 12:1, a biodegradability at 28 days of at least 60%, as measured according to the OECD 306 standard, a biocarbon content of at least 95% by weight, and containing less than 100 ppm aromatics by weight.

According to an embodiment, the fluid has a boiling point in the range 150 to 400° C., preferably from 200 to 400° C., especially 220 to 340° C. and advantageously more than 250° C. and up to 340° C.

According to an embodiment, the fluid has a boiling range below 80° C., preferably below 60° C., advantageously between 40 and 50° C.

According to an embodiment, the fluid contains less than 50 ppm aromatics by weight, and preferably less than 20 ppm by weight.

According to an embodiment, the fluid contains less than 3% by weight of naphthens by weight, preferably less than 1% and advantageously less than 50 ppm by weight.

According to an embodiment, the fluid contains less than 5 ppm, even less than 3 ppm and preferably less than 0.5 ppm sulphur.

According to an embodiment, the fluid comprises more than 98% isoparaffins by weight.

According to an embodiment, the fluid has a ratio of iso-paraffins to n-paraffins of at least 12:1, preferably at least 15:1, more preferably at least 20:1.

According to an embodiment, the fluid has a biodegradability at 28 days of at least 60%, as measured according to the OECD 306 standard, preferably at least 70% by weight, more preferably at least 75% and advantageously at least 80%, as measured according to the OECD 306 standard.

According to an embodiment, the fluid has a biocarbon content of at least 95% by weight, preferably at least 97%, more preferably at least 98%, and even more preferably about 100%.

Another object of the invention is the use of the improved fluids. The invention thus provides for the use of the fluids of the invention, as drilling fluids, in hydraulic fracturing, in mining, in water treatments, as industrial solvents, in paints composition, for decorative coatings, in coating fluids, in car industry, in textile industry, in metal extraction, in explosives, in oil dispersants, in concrete demoulding formulations, in adhesives, in printing inks, in metal working fluids, coating fluids, rolling oils especially for aluminum, as cutting fluids, as rolling oils, as electric discharge machining (EDM) fluids, rust preventive, industrial lubricants, as extender oils, in sealants such as mastics or polymers especially with silicone, as viscosity depressants in plasticised polyvinyl chloride formulations, in resins, in varnishes, as phytosanitary fluid especially as crop protection fluids, as adjuvant or excipient in vaccine preparations, in paint compositions, especially low-odor paints, in polymers used in water treatment, paper manufacturing or printing pastes especially as thickener, cleaning and/or degreasing solvents, for slurry polymerization, in food processing industry, for food grade application, home care, heat-transfer media, shock absorbers, insulation oils, hydraulic oils, gear oils, turbine oils, textile oils and in transmission fluids such as automatic transmission fluids or manual gear box formulations, and as solvents in chemical reactions including cristallization, extraction and fermentation.

DESCRIPTION OF EMBODIMENTS OF THE INVENTION

The feedstock will first be disclosed, then the hydrogenation step and the associated fractionating step, and finally the improved fluids.

Feedstock.

The feedstock or simply feed is a feed which is the result of a process of hydrodeoxygenation followed by isomerization, hereafter "HDO/ISO", as practiced on a biomass.

This HDO/ISO process is applied on biological raw materials, the biomass, selected from the group consisting of vegetable oils, animal fats, fish oils, and mixtures thereof, preferably vegetable oils. Suitable vegetable raw materials include rapeseed oil, canola oil, colza oil, tall oil, sunflower oil, soybean oil, hemp oil, olive oil, linenseed oil, mustard oil, palm oil, arachis oil, castor oil, coconut oil, animal fats such as suet, tallow, blubber, recycled alimentary fats, starting materials produced by genetic engineering, and biological starting materials produced by microbes such as algae and bacteria. Condensation products, esters, or other derivatives obtained from biological raw materials may also be used as starting materials. An especially preferred vegetable raw material is an ester or triglyceride derivative. This material is submitted to an hydrodeoxygenation (HDO) step for decomposing the structure of the biological ester or triglyceride constituent, and for removing oxygen, phosphorus and sulfur (part of) compounds, concurrently hydrogenating the olefinic bonds, followed by isomerization of the product thus obtained, thus branching the hydrocarbon chain and improving the low temperature properties of the thus-obtained feedstock.

In the HDO step, hydrogen gas and the biological constituent are passed to the HDO catalyst bed either in countercurrent or concurrent manner. In the HDO step, the pressure and the temperature range typically between 20 and 150 bar, and between 200 and 500° C., respectively. In the HDO step, known hydrodeoxygenation catalysts may be used. Prior to the HDO step, the biological raw material may optionally be subjected to prehydrogenation under milder conditions to avoid side reactions of the double bonds. After the HDO step, the product is passed to the isomerization step where hydrogen gas and the biological constituent to be hydrogenated, and optionally a n-paraffin mixture, are passed to the isomerization catalyst bed either in concurrent or countercurrent manner. In the isomerization step, the pressure and the temperature range between typically 20 and 150 bar, and between 200 and 500° C., respectively. In the isomerization step, isomerization catalysts known as such may be typically used.

Secondary process steps can also be present (such as intermediate pooling, scavenging traps, and the like).

The product issued from the HDO/ISO steps may for instance be fractionated to give the desired fractions.

Various HDO/ISO processes are disclosed in the literature. WO2014/033762 discloses a process which comprises a pre-hydrogenation step, a hydrodeoxygenation step (HDO) and an isomerization step which operates using the countercurrent flow principle. EP1728844 describes a process for the production of hydrocarbon components from mixtures of a vegetable or animal origin. The process comprises a pretreatment step of the mixture of a vegetable origin for removing contaminants, such as, for example, alkaline metals salts, followed by a hydrodeoxygenation (HDO) step and an isomerization step. EP2084245 describes a process for the production of a hydrocarbon mixture that can be used as diesel fuel or diesel component by the hydrodeoxygenation of a mixture of a biological origin containing fatty acid esters possibly with aliquots of free fatty acids, such as for example vegetable oils such as sunflower oil, rape oil, canola oil, palm oil, or fatty oils contained in the pulp of pine trees (tall oil), followed by hydroisomerization on specific catalysts. EP2368967 discloses such a process and the thus-obtained product.

Feedstocks typically contain less than 15 ppm of sulphur, preferably less than 8 ppm and more preferably less than 5 ppm, especially less than 1 ppm, as measured according to EN ISO 20846. Typically the feedstocks will comprise no sulphur as being biosourced products.

Before entering the hydrogenation unit, a pre-fractionation step can take place. Having a more narrow boiling range entering the unit allows having a more narrow boiling range at the outlet. Indeed typical boiling ranges of pre-fractionated cuts are 220 to 330° C. while cuts without a pre-fractionating step typically have a boiling range from 150° C. to 360° C.

Hydrogenation Step.

The feedstock issued from HDO/ISO is then hydrogenated. The feedstock can optionally be pre-fractionated.

Hydrogen that is used in the hydrogenation unit is typically a high purity hydrogen, e.g. with a purity of more than 99%, albeit other grades can be used.

Hydrogenation takes place in one or more reactors. The reactor can comprise one or more catalytic beds. Catalytic beds are usually fixed beds.

Hydrogenation takes place using a catalyst. Typical hydrogenation catalysts include but are not limited to: nickel, platinum, palladium, rhenium, rhodium, nickel tungstate, nickel molybdenum, molybdenum, cobalt molybdenate, nickel molybdenate on silica and/or alumina carriers or zeolites. A preferred catalyst is Ni-based and is supported on an alumina carrier, having a specific surface area varying between 100 and 200 $m^2/g$ of catalyst.

The hydrogenation conditions are typically the following:
Pressure: 50 to 160 bars, preferably 100 to 150 bars;
Temperature: 80 to 180° C., preferably 120 to 160° C.;
Liquid hourly space velocity (LHSV): 0.2 to 5 $hr^{-1}$, preferably 0.5 to 3;
Hydrogen treat rate: adapted to the above conditions, which can be up to 200 $Nm^3$/ton of feed.

The hydrogenation process of the invention can be carried out in several stages. There can be two or three stages, preferably three stages, preferably in three separate reactors. The first stage will operate the sulphur trapping, hydrogenation of substantially all unsaturated compounds, and up to about 90% of hydrogenation of aromatics. The flow exiting from the first reactor contains substantially no sulphur. In the second stage the hydrogenation of the aromatics continues, and up to 99% of aromatics are hydrogenated. The third stage is a finishing stage, allowing an aromatic content as low as 100 ppm by weight or even less such as below 50 ppm, even for high boiling products.

The catalysts can be present in varying or substantially equal amounts in each reactor, e.g. for three reactors according to weight amounts of 0.05-0.5/0.10-0.70/0.25-0.85, preferably 0.07-0.25/0.15-0.35/0.4-0.78 and most preferably 0.10-0.20/0.20-0.32/0.48-0.70.

It is also possible to have one or two hydrogenation reactors instead of three.

It is also possible that the first reactor be made of twin reactors operated alternatively in a swing mode. This may be useful for catalyst charging and discharging: since the first reactor comprises the catalyst that is poisoned first (substantially all the sulphur is trapped in and/or on the catalyst) it should be changed often.

One reactor can be used, in which two, three or more catalytic beds are installed.

It may be necessary to insert quenches on the recycle to cool effluents between the reactors or catalytic beds to control reaction temperatures and consequently hydrothermal equilibrium of the hydrogenation reaction. In a preferred embodiment, there is no such intermediate cooling or quenching.

In case the process makes use of 2 or 3 reactors, the first reactor will act as a sulphur trap. This first reactor will thus trap substantially all the sulphur. The catalyst will thus be saturated very quickly and may be renewed from time to time. When regeneration or rejuvenation is not possible for such saturated catalyst the first reactor is considered as a sacrificial reactor which size and catalyst content both depend on the catalyst renewal frequency.

In an embodiment the resulting product and/or separated gas is/are at least partly recycled to the inlet of the hydrogenation stages. This dilution helps, if this were to be needed, maintaining the exothermicity of the reaction within controlled limits, especially at the first stage. Recycling also allows heat-exchange before the reaction and also a better control of the temperature.

The stream exiting the hydrogenation unit contains the hydrogenated product and hydrogen. Flash separators are used to separate effluents into gas, mainly remaining hydrogen, and liquids, mainly hydrogenated hydrocarbons. The process can be carried out using three flash separators, one of high pressure, one of medium pressure, and one of low pressure, very close to atmospheric pressure.

The hydrogen gas that is collected on top of the flash separators can be recycled to the inlet of the hydrogenation unit or at different levels in the hydrogenation units between the reactors.

Because the final separated product is at about atmospheric pressure, it is possible to feed directly the fractionation stage, which is preferably carried out under vacuum pressure that is at about between 10 to 50 mbars, preferably about 30 mbars.

The fractionation stage can be operated such that various hydrocarbon fluids can be withdrawn simultaneously from the fractionation column, and the boiling range of which can be predetermined.

Therefore, fractionation can take place before hydrogenation, after hydrogenation, or both.

The hydrogenation reactors, the separators and the fractionation unit can thus be connected directly, without having to use intermediate tanks. By adapting the feed, especially the initial and final boiling points of the feed, it is possible to produce directly, without intermediate storage tanks, the final products with the desired initial and final boiling points. Moreover, this integration of hydrogenation and fractionation allows an optimized thermal integration with reduced number of equipment and energy savings.

Fluids of the Invention.

The fluids of the invention, especially those produced according to the process of the invention, hereafter referred to simply as "the improved fluids" possess outstanding properties, in terms of aniline point or solvency power, molecular weight, vapour pressure, viscosity, defined evaporation conditions for systems where drying is important, and defined surface tension.

The improved fluids are primarily isoparaffinic and contain more than 95% isoparaffins by weight, preferably more than 98%.

The improved fluids typically contain less than 3% by weight of naphthens, preferably less than 1% and advantageously less than 50 ppm by weight.

The improved fluids typically have a ratio of iso-paraffins to n-paraffins of at least preferably at least 12:1, more preferably at least 15:1, more preferably more than 20:1.

Typically, the improved fluids comprise carbon atoms number from 6 to 30, preferably 8 to 24 and most preferably from 9 to 20 carbon atoms.

The improved fluids have a boiling range from 100 to 400° C. and also exhibit an enhanced safety, due to the very low aromatics content.

The improved fluids typically contain less than 100 ppm by weight, more preferably less than 50 ppm, advantageously less than 20 ppm aromatics (measured using a UV method). This makes them suitable for use in crop protection fluids. This is especially useful for high temperature boiling products, typically products boiling in the range 300-400° C., preferably 320-380° C.

The boiling range of the improved fluids is preferably not more than 80° C., preferably not more than 70° C., more preferably not more than 60° C., advantageously between 40 and 50° C.

The improved fluids also have an extremely low sulphur content, typically less than 5 ppm, even less than 3 ppm and preferably less than 0.5 ppm, at a level too low to be detected by the usual low-sulphur analyzers.

The improved fluids find various uses, including but not limited to: as drilling fluids, in hydraulic fracturing, in mining, in water treatments, as industrial solvents, in paints composition, for decorative coatings, in coating fluids, in car industry, in textile industry, in metal extraction, in explosives, in oil dispersants, in concrete demoulding formulations, in adhesives, in printing inks, in metal working fluids, coating fluids, rolling oils especially for aluminum, as cutting fluids, as rolling oils, as electric discharge machining (EDM) fluids, rust preventive, industrial lubricants, as extender oils, in sealants such as mastics or polymers especially with silicone, as viscosity depressants in plasticised polyvinyl chloride formulations, in resins, in varnishes, as phytosanitary fluid especially as crop protection fluids, as adjuvant or excipient in vaccine preparations, in paint compositions, especially low-odor paints, in polymers used in water treatment, paper manufacturing or printing pastes especially as thickener, cleaning and/or degreasing solvents, for slurry polymerization, in food processing industry, for food grade application, home care, heat-transfer media, shock absorbers, insulation oils, hydraulic oils, gear oils, turbine oils, textile oils and in transmission fluids such as automatic transmission fluids or manual gear box formulations, and as solvents in chemical reactions including cristallization, extraction and fermentation.

In all this foreseen uses, the Initial Boiling Point (IBP) to Final Boiling Point (FBP) range is selected according to the particular use and composition. An Initial Boiling Point of more than 250° C. allows classification as free of VOC (Volatile Organic Compound) according to the directive 2004/42/CE.

The isoparaffinic nature of the improved fluids allows for improved low temperature properties.

The improved fluids are also useful as components in adhesives, sealants or polymer systems such as silicone sealant, modified silane polymers where they act as extender oils and as viscosity depressants for polyvinyl chloride (PVC) pastes or Plastisol formulations.

The improved fluids may also be used as new and improved solvents, particularly as solvents for resins. The solvent-resin composition may comprise a resin component dissolved in the fluid, the fluid comprising 5 to 95% by total volume of the composition.

The improved fluids may be used in place of solvents currently used for inks, coatings and the like.

The improved fluids may also be used to dissolve resins such as: acrylic-thermoplastic, acrylic-thermosetting, chlorinated rubber, epoxy (either one or two part), hydrocarbon (e.g., olefins, terpene resins, rosin esters, petroleum resins, coumarone-indene, styrene-butadiene, styrene, methyl-styrene, vinyl-toluene, polychloroprene, polyamide, polyvinyl chloride and isobutylene), phenolic, polyester and alkyd, polyurethane and modified polyurethane, silicone and modified silicone (MS polymers), urea, and, vinyl polymers and polyvinyl acetate.

Examples of the type of specific applications for which the improved fluids and fluid-resin blends may be used include coatings, cleaning compositions and inks. For coatings the blend preferably has high resin content, i.e., a resin content of 20% to 80% by volume. For inks, the blend preferably contains a lower concentration of the resin, i.e., 5%-30% by volume.

In yet another embodiment, various pigments or additives may be added.

The improved fluids can be used as cleaning compositions for the removal of hydrocarbons The improved fluids may also be used in cleaning compositions such as for use in removing ink, more specifically in removing ink from printing.

In the offset printing industry it is important that ink can be removed quickly and thoroughly from the printing surface without harming the metal or rubber components of the printing machine. Further there is a tendency to require that the cleaning compositions are environmentally friendly in that they contain no or hardly any aromatic volatile organic compounds and/or halogen containing compounds. A further trend is that the compositions fulfil strict safety regulations. In order to fulfil the safety regulations, it is preferred that the compositions have a flash point of more than 62° C., more preferably a flash point of 90° C. or more. This makes them very safe for transportation, storage and use. The improved fluids have been found to give a good performance in that ink is readily removed while these requirements are met.

The improved fluids are also useful as drilling fluids, such as a drilling fluid which has the fluid prepared by the process of this invention as a continuous oil phase. The improved fluids may also be used as a penetration rate enhancer comprising a continuous aqueous phase containing the improved fluid dispersed therein.

Fluids used for offshore or on-shore applications need to exhibit acceptable biodegradability, human, eco-toxicity, eco-accumulation and lack of visual sheen credentials for them to be considered as candidate fluids for the manufacturer of drilling fluids. In addition, fluids used in drilling uses need to possess acceptable physical attributes. These generally include a viscosity of less than 4.0 mm$^2$/s at 40° C., a flash value of usually more than 90° C. and, for cold weather applications, a pour point at −40° C. or lower. These properties have typically been only attainable through the use of expensive synthetic fluids such as hydrogenated polyalphaolefins, as well as unsaturated internal olefins and linear alpha-olefins and esters. The properties can now be obtained in the improved fluids.

Drilling fluids may be classified as either water-based or oil-based, depending upon whether the continuous phase of the fluid is mainly oil or mainly water. Water-based fluids may however contain oil and oil-based fluids may contain water and the fluids produced according to the process of the invention are particularly useful as the oil phase.

Typically preferred ASTM D-86 boiling ranges for the uses of the fluids are that of printing ink solvents (sometimes known as distillates) have boiling ranges in the ranges of 235° C. to 265° C., 260° C. to 290° C., 280° C. to 315° C. and 300° C. to 355° C. Fluids preferred for use as drilling fluids have boiling ranges in the ranges of 195° C. to 240° C., 235° C. to 265° C. and 260° C. to 290° C. Fluids preferred for explosives, concrete demoulding, industrial lubricants, transmission fluids and metal working fluids have boiling ranges in the ranges of 185° C. to 215° C., 195° C. to 240° C., 235° C. to 365° C., 260° C. to 290° C., 280° C. to 325° C. and 300° C. to 360° C. Fluids preferred as extenders for sealants have boiling ranges in the ranges of 195° C. to 240° C., 235° C. to 265° C., 260° C. to 290° C., 280° C. to 325° C. or 300° C. to 360° C. Fluids preferred as viscosity depressants for polyvinyl chloride plastisols have boiling ranges in the ranges of 185° C. to 215° C., 195° C. to 240° C., 235° C. to 265° C., 260° C. to 290° C., 280° C. to 315° C. and 300° C. to 360° C.

Fluids preferred as carrier for polymeric composition used in water treatment, mining operation or printing pastes have boiling ranges in the ranges of 185° C. to 215° C., 195° C. to 240° C., 235° C. to 265° C., 260° C. to 290° C., 280° C. to 315° C. and 300° C. to 360° C.

Fluids preferred for crop protection application have boiling ranges in the range of 300 and 370° C., such fluids being used in combination with hydrocarbon fluids such as isodewaxed hydrocarbons or any hydrocarbons having comparable properties such as viscosity.

For paint compositions and cleaning applications, the most preferred boiling ranges are in the ranges of 140 to 210° C., and 180 to 220° C. Fluids showing an initial boiling point above 250° C. and a final boiling point close to 330° C. or preferably close to 290° C. will be preferred for low VOC coatings formulations.

Biodegradation of an organic chemical refers to the reduction in complexity of the chemical through metabolic activity of microorganisms. Under aerobic conditions, microorganisms convert organic substances into carbon dioxide, water and biomass. OECD 306 method, is available for assessing biodegradability of individual substances in seawater. OECD Method 306 can be carried out as either a shake flask or Closed Bottle method and the only microorganisms added are those microorganisms in the test seawater to which the test substance is added. In order to assess the biotic degradation in seawater, a biodegradability test was performed which allows the biodegradability to be measured in seawater. The biodegradability was determined in the Closed Bottle test performed according to the OECD 306 Test Guidelines. The biodegradability of the improved fluids is measured according to the OECD Method 306.

The OECD Method 306 is the following:

The closed bottle method consists on dissolution of a pre-determined amount of the test substance in the test medium in a concentration of usually 2-10 mg/l, with one or more concentrations being optionally used. The solution is kept in a filled closed bottle in the dark in a constant temperature bath or enclosure controlled within a range of 15–20° C. The degradation is followed by oxygen analyses over a 28-day period. Twenty-four bottles are used (8 for test substance, 8 for reference compound and 8 for sweater plus nutriment). All analyses are performed on duplicate bottles. Four determinations of dissolved oxygen, at least, are performed (day 0, 5, 15 and 28) using a chemical or electrochemical method.

Results are thus expressed in % degradability at 28 days. The improved fluids have a biodegradability at 28 days of at least 60%, as measured according to the OECD 306 standard, preferably at least 70% by weight, more preferably at least 75% and advantageously at least 80%.

The invention uses the products of natural origin like starting products. The carbon of a biomaterial comes from the photosynthesis of the plants and thus of atmospheric $CO_2$. The degradation (by degradation, one will understand also combustion/incineration at the end of the lifetime) of these CO2 materials thus does not contribute to the warming since there is no increase in the carbon emitted in the atmosphere. The assessment $CO_2$ of the biomaterials is thus definitely better and contributes to reduce the print carbon of the products obtained (only energy for manufacture is to be taken into account). On the contrary, a fossil material of origin being also degraded out of $CO_2$ will contribute to the increase in the $CO_2$ rate and thus to climate warming. The improved fluids according to the invention will thus have a print carbon which will be better than that of compounds obtained starting from a fossil source.

The invention thus improves also the ecological assessment during the manufacture of the improved fluids. The term of "bio-carbon" indicates that carbon is of natural origin and comes from a biomaterial, as indicated hereafter. The content of biocarbon and the content of biomaterial are expressions indicating the same value.

A renewable material of origin or biomaterial is an organic material in which carbon comes from $CO_2$ fixed recently (on a human scale) by photosynthesis starting from the atmosphere. On ground, this $CO_2$ is collected or fixed by the plants. At sea, $CO_2$ is collected or fixed by microscopic bacteria or plants or algae carrying out a photosynthesis. A biomaterial (carbon natural origin 100%) presents an isotopic ratio $^{14}C/^{12}C$ higher than $10^{-12}$, typically about $1.2 \times 10^{-12}$, while a fossil material has a null ratio. Indeed, the isotope $^{14}C$ is formed in the atmosphere and is then integrated by photosynthesis, according to a scale of time of a few tens of years at the maximum. The half-life of $^{14}C$ is 5730 years. Thus the materials resulting from photosynthesis, namely the plants in a general way, have necessarily a maximum content of isotope $^{14}C$.

The determination of the content of biomaterial or content of biocarbon is given pursuant to standards ASTM D 6866-12, method B (ASTM D 6866-06) and ASTM D 7026 (ASTM D 7026-04). Standard ASTM D 6866 concerns "Determining the Biobased Content of Natural Range Materials Using Radiocarbon and Isotope Ratio Mass Spectrometry Analysis", while standard ASTM D 7026 concerns "Sampling and Reporting of Results for Determination of Biobased Content of Materials via Carbon Isotope Analysis". The second standard mentions the first in its first paragraph.

The first standard describes a test of measurement of the ratio $^{14}C/^{12}C$ of a sample and compares it with the ratio $^{14}C/^{12}C$ of a sample renewable reference of origin 100%, to give a relative percentage of C of origin renewable in the sample. The standard is based on the same concepts that the dating with $^{14}C$, but without making application of the equations of dating. The ratio thus calculated is indicated as the "pMC" (percent Modem Carbon). If the material to be analyzed is a mixture of biomaterial and fossil material (without radioactive isotope), then the value of pMC obtained is directly correlated with the quantity of biomaterial present in the sample. The value of reference used for the dating to $^{14}C$ is a value dating from the years 1950. This year was selected because of the existence of nuclear tests in the atmosphere which introduced great quantities of isotopes into the atmosphere after this date. The reference 1950 corresponds to a value pMC of 100. Taking into account the thermonuclear tests, the current value to be retained is approximately 107.5 (what corresponds to a factor of correction of 0.93). The signature into radioactive carbon of a current plant is thus of 107.5. A signature of 54 pMC and 99 pMC thus correspond to a quantity of biomaterial in the sample of 50% and 93%, respectively.

The compounds according to the invention come at least partly from biomaterial and thus present a content of biomaterial from at least 95%. This content is advantageously even higher, in particular more than 98%, more preferably more than 99% and advantageously about 100%. The compounds according to the invention can thus be bio-carbon of 100% biosourced or on the contrary to result from a mixture with a fossil origin. According to an embodiment, the isotopic ratio $^{14}C/^{12}C$ is between 1.15 and $1.2 \times 10^{-12}$.

All percentages and ppm are by weight unless indicated to the contrary. Singular and plural are used interchangeably to designate the fluid(s).

EXAMPLE

The following example illustrates the present invention without limitation.

A feedstock being a feedstock of a kerosene, obtained a process that converts liquid lipid sources (vegetal oil, animal fats etc.) thanks to the steps of hydrotreatment, hydrocracking and isomerization, is used in the process of the invention. This kerosene had an aromatic content of 1000 ppm.

The following conditions for hydrogenation are used:

The temperature in the reactors is about 150-160° C.; the pressure is about 100 bars and the liquid hourly space velocity is 0.6 h$^{-1}$; the treat rate is adapted. The catalyst used is nickel on alumina.

The resulting product is obtained, with the following properties.

| Characteristic | Ex. 1 |
| --- | --- |
| Aromatic content (ppm) | <20 |
| Sulfur content (ppm) | 0.1 |
| % isoparaffins (w/w) | 96.2 |
| % n-paraffins (w/w) | 3.8 |
| % naphthenic (w/w) | 0 |
| C8 (iso) | 1.46 |
| C9 (iso) | 6.49 |
| C10 (iso) | 7.99 |
| C11 (iso) | 8.23 |
| C12 (iso) | 7.81 |
| C13 (iso) | 6.55 |
| C14 (iso) | 4.84 |
| C15 (iso) | 7.07 |
| C16 (iso) | 28.49 |
| C17 (iso) | 1.89 |
| C18 (iso) | 15.4 |
| C quat sat | 0.0 |
| CH sat | 13.7 |
| CH$_2$ sat | 62.4 |
| CH$_3$ sat | 23.7 |
| CH$_3$ long chain | 16.2 |
| CH$_3$ short chain | 7.6 |
| Biocarbon content (%) | 100.0 |
| Initial Boiling Point (° C.) | 120.6 |
| 5% point (° C.) | 144.1 |
| 50% point (° C.) | 260.5 |
| 95% point (° C.) | 301.7 |
| Dry point (° C.) | 311.1 |
| OECD biodegradability (28 days) (%) | 80 |

These results show that the product prepared according to the process of the invention is free of sulphur and exhibits a very low aromatic content, and is isoparaffinic in nature. Its specific branching distribution and ultra low aromatics content allow for biodegradability and compliance with stringent regulations. Its properties make it very suitable for hydrocarbon fluid applications as special fluids.

The invention claimed is:

1. A method of lubricating or solvating, comprising:
providing a fluid, wherein the fluid has an initial boiling point and a final boiling point in the range of from 185 to 400° C., and a boiling range below 80° C., and comprising more than 95% isoparaffins and containing less than 100 ppm aromatics by weight and less than 50 ppm by weight of naphthens,
wherein the fluid is obtained by a process comprising a step of catalytically hydrogenating a feed comprising more than 95% by weight of a hydrodeoxygenated isomerized hydrocarbon biomass feedstock, at a temperature from 80 to 180° C., at a pressure from 50 to 160 bars, a liquid hourly space velocity of 0.2 to 5 h$^{-1}$ and an hydrogen treat rate up to 200 Nm$^3$/ton of feed, wherein the step of catalytically hydrogenating is performed in three stages in three separate reactors, wherein the three separate reactors contain a total weight of catalyst, X, and a weight of catalyst in each of the three reactors is 0.05X-0.5X, 0.10X-0.70X, and 0.25X-0.85X, respectively,
wherein the fluid has a biodegradability at 28 days of at least 60%, as measured according to the OECD 306 standard; and
wherein the method comprises a step of lubricating or solvating using the fluid.

2. The method of claim 1, wherein the step of lubricating or solvating is a step of drilling in hydraulic fracturing, in mining, in water treatments.

3. The method of claim 1, wherein the step of lubricating or solvating is a step wherein the fluid is used as a lubricant or solvent in a paint composition, for decorative coatings, in coating fluids, in car industry, in textile industry, in metal extraction, in explosives, in oil dispersants, in concrete demoulding formulations, in adhesives, in printing inks, in metal working fluids, coating fluids, rolling oils, as cutting fluids, as rolling oils, as electric discharge machining (EDM) fluids, rust preventive, industrial lubricants, as extender oils, in sealants, as viscosity depressants in plasticised polyvinyl chloride formulations, in resins, in varnishes, as phytosanitary fluid, as adjuvant or excipient in vaccine preparations, in polymers used in water treatment, paper manufacturing or printing pastes, cleaning and/or degreasing solvents, for slurry polymerization, in food processing industry, for food grade application, home care, heat-transfer media, shock absorbers, insulation oils, hydraulic oils, gear oils, turbine oils, textile oils and in transmission fluids, and as solvents in chemical reactions including crystallization, extraction and fermentation.

4. The method of claim 1, wherein the fluid comprises more than 95% isoparaffins and less than 3% of naphthens by weight and having a ratio of isoparaffins to n-paraffins of at least 12:1, a biodegradability at 28 days of at least 60%, as measured according to the OECD 306 standard, a biocarbon content of at least 95% by weight, and containing less than 100 ppm aromatics by weight.

5. The method of claim 1, wherein the fluid has an initial boiling point and a final boiling point in the range 220 to 400° C.

6. The method of claim 1, wherein the fluid has a boiling range below 60° C.

7. The method of claim 1, wherein the fluid contains less than 50 ppm aromatics by weight.

8. The method of claim 1, wherein the fluid contains less than 3% by weight of naphthens.

9. The method of claim 1, wherein the fluid comprises more than 98% isoparaffins by weight.

10. The method of claim 1, wherein the fluid has a ratio of isoparaffins to n-paraffins of at least 12:1.

11. The method of claim 1, wherein the fluid has a biocarbon content of at least 95% by weight.

12. A method of lubricating or solvating, comprising:
providing a fluid, wherein the fluid has an initial boiling point and a final boiling point in the range of from 100 to 400° C. and a boiling range below 80° C. and comprising more than 95% isoparaffins and containing less than 100 ppm aromatics by weight and having a biocarbon content of at least 95% by weight,
wherein the fluid is obtained by a process comprising a step of catalytically hydrogenating a feed comprising more than 95% by weight of a hydrodeoxygenated isomerized hydrocarbon biomass feedstock, at a temperature from 80 to 180° C., at a pressure from 50 to 160 bars, a liquid hourly space velocity of 0.2 to 5 hr$^{-1}$ and an hydrogen treat rate up to 200 Nm$^3$/ton of feed, wherein the step of catalytically hydrogenating is performed in three stages, the first stage operating a sulphur trapping, hydrogenation of substantially all unsaturated compounds, and up to about 90% of hydrogenation of aromatics, the second stage continuing the hydrogenation of the aromatics such that up to 99% of aromatics are hydrogenated, the third stage being a finishing stage allowing the aromatic content as low as 100 ppm by weight;
wherein the fluid has a flash point of at least 62° C.; and
wherein the method comprises a step of lubricating or solvating using the fluid,
wherein the step of lubricating or solvating is a step wherein the fluid is used as a lubricant or solvent in car industry, in textile industry, in metal extraction, as electric discharge machining (EDM) fluids, rust preventive, as viscosity depressants in plasticised polyvinyl chloride formulations, in resins, in varnishes, as phytosanitary fluid, heat-transfer media, shock absorbers, insulation oils, gear oils, turbine oils, textile oils and in transmission fluids, and as solvents in chemical reactions including crystallization, extraction and fermentation.

13. The method of claim 12, wherein the step of lubricating or solvating is a step of drilling in hydraulic fracturing, in mining, in water treatments.

14. The method of claim 12, wherein the fluid has a biodegradability at 28 days of at least 60%, as measured according to the OECD 306 standard.

15. The method of claim 13, wherein the fluid has one or more of the following features:
a flash point of at least 90° C.; or
an initial boiling point and a final boiling point in the range 150 to 400° C.

16. The method of claim 1, wherein the first stage operates a sulphur trapping, hydrogenation of substantially all unsaturated compounds, and up to about 90% of hydrogenation of aromatics, the second stage continues the hydrogenation of the aromatics such that up to 99% of aromatics are hydrogenated, the third stage is a finishing stage allowing the aromatic content as low as 100 ppm by weight.

17. The method of claim 12, wherein the step of catalytically hydrogenating is performed in three separate reactors, wherein the three separate reactors contain a total weight of catalyst, X, and a weight of catalyst in each of the three reactors is 0.05X-0.5X, 0.10X-0.70X, and 0.25X-0.85X, respectively.

* * * * *